United States Patent
Caron et al.

(10) Patent No.: US 6,511,610 B2
(45) Date of Patent: Jan. 28, 2003

(54) COMPOSITION THAT CAN BE USED AS A REFRIGERANT

(75) Inventors: Laurent Caron, Courbevoie (FR); Gérard Guilpain, Rueil Malmaison (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/940,634

(22) Filed: Aug. 29, 2001

(65) Prior Publication Data

US 2002/0050583 A1 May 2, 2002

(30) Foreign Application Priority Data

Sep. 4, 2000 (FR) ................................. 0011229

(51) Int. Cl.$^7$ .............................. C09K 5/04; A62D 1/00; B01F 1/00
(52) U.S. Cl. .............................. 252/69; 252/68; 252/67; 252/364; 252/2; 252/8; 62/112; 62/114; 510/410; 510/412
(58) Field of Search ............................. 252/67, 68, 69, 252/2, 8, 364, DIG. 9; 510/407, 408, 410, 412, 415; 62/112, 114

(56) References Cited

U.S. PATENT DOCUMENTS

| 5,277,834 | A | * | 1/1994 | Bivens et al. | .................. | 252/67 |
| 5,409,962 | A | * | 4/1995 | Bartlett et al. | ................. | 521/88 |
| 5,417,871 | A | * | 5/1995 | Minor et al. | ................... | 252/67 |
| 5,516,446 | A | | 5/1996 | Bivens et al. | .................. | 252/67 |
| 5,736,062 | A | * | 4/1998 | Basile et al. | ................... | 252/67 |
| 5,746,933 | A | * | 5/1998 | Ishida et al. | ................... | 252/68 |
| 5,954,995 | A | * | 9/1999 | Goble | .......................... | 252/67 |
| 6,187,219 | B1 | * | 2/2001 | Omure et al. | .................. | 252/67 |
| 6,251,300 | B1 | * | 6/2001 | Takigawa et al. | ............. | 252/67 |
| 6,261,474 | B1 | * | 7/2001 | Egawa et al. | ................. | 252/68 |

FOREIGN PATENT DOCUMENTS

| EP | 0 545 942 | * | 6/1993 |
| EP | 0 638 623 A | | 2/1995 |
| WO | WO 94/26835 | | 11/1994 |

* cited by examiner

Primary Examiner—Joseph D. Anthony
(74) Attorney, Agent, or Firm—Smith, Gambrell & Russell, LLP

(57) ABSTRACT

Composition consisting essentially of 55 to 94% R-125, 2.5 to 35% of R-134a and 3.5 to 25% by weight of DME, and its use as a refrigerant in a heat transfer system designed for R-22 and comprising, as lubricant, a mineral oil or an alkylbenzene oil.

7 Claims, 1 Drawing Sheet

COMPOSITION THAT CAN BE USED AS A REFRIGERANT

DESCRIPTION

1. Field of the Invention

The subject of the present invention is a composition comprising pentafluoroethane, 1,1,1,2-tetrafluoroethane and dimethyl ether, its use in refrigeration and/or air conditioning and a heat transfer system containing it.

2. Background of the Invention

Heat transfer systems include, for example, refrigerators, heat pumps and air conditioning systems.

In such devices, a refrigerant of suitable boiling point is evaporated at low pressure, taking heat from a first surrounding medium (or zone). The vapor thus formed is then compressed using a compressor and then passes into a condenser in which it is converted to the liquid state, giving rise to a release of heat into a second surrounding zone. The liquid thus condensed then flows into a pressure reducer, at the outlet of which it turns into a biphasic mixture of liquid and vapor which is finally introduced into the evaporator where the liquid is once again evaporated at low pressure, which completes the cycle.

The mechanical energy required to compress the vapor and to circulate the fluid is provided by an electric motor or by an internal combustion engine. As in any mechanical device, it is necessary for the moving parts to be suitably lubricated. The lubricants used form an integral part of the heat transfer system and govern both its performance and its life through the long-term maintaining of suitable lubrication.

In particular, the refrigerant which, each time it passes through the compressor, comes into contact with the lubricant present on its moving parts, tends to carry off a certain amount of lubricant which accompanies the refrigerant in its cycle and therefore finds itself in the evaporator. Now, the latter is generally brought to a low temperature, at which the viscosity of the lubricant is particularly high, which means that there is a risk that this lubricant will accumulate in the evaporator and therefore no longer be able to return to the compressor, this return being termed, in this current text, the "return of oil".

Hence, if this return of oil is insufficient, the amount of lubricant present on the moving parts of the compressor cannot be kept constant over time, which therefore impacts on the suitable operation of the said compressor and on its life.

It is therefore necessary to use a refrigerant/oil pairing which is perfectly compatible, particularly as regards the return of oil.

R-22 or monochlorodifluoromethane is a refrigerant of the HCFC (HydroChloroFluoroCarbon) type widely used in heat transfer applications, including fixed air conditioning, commercial and industrial refrigeration and heat pumps. There are currently numerous heat transfer systems designed for R-22; the lubricants used, because they are suited to R-22, particularly as regards the return of oil, are either mineral oils or alkylbenzene oils.

Although R-22 has a very low ozone depletion potential (hereafter known as ODP), its use is, however, subject to restrictions also, and new products based on HFCs (HydroFluoroCarbons) have been developed, these being particularly beneficial in terms of the stratospheric ozone layer, because HFCs have a zero ODP.

Amongst these products, R-407C has, in particular, been developed to replace R-22 in air conditioning applications. This product is a mixture combining R-32, R-125, R-134a in the proportions of 23/25/52% by weight. R-32 is the conventional trade jargon for difluoromethane, R-125 is pentafluoroethane, and R-134a denotes 1,1,1,2-tetrafluoroethane. R-407C has thermodynamic properties which are very similar to those of R-22. As a result, R-407C can be used in old systems designed to run on R-22, thus allowing an HCFC fluid to be replaced by an HFC fluid which is safer with regard to the stratospheric ozone layer, in the context of a process of converting these old systems. The thermodynamic properties concerned are well known to those skilled in the art and are, in particular, the refrigeration capacity, the coefficient of performance (or COP), the condensation pressure, the evaporation pressure and the distillation range (or glide).

The refrigeration capacity represents the refrigeration power available by virtue of the refrigerant, for a given compressor. To replace R-22 it is essential to have a fluid whose refrigeration capacity is high and close to that of R-22.

The COP expresses the ratio of the refrigerating energy delivered to the energy applied to the compressor for compressing the refrigerant in the vapor state. Within the context of substituting R-22, a COP value for the fluid which is below that of R-22 is suitable if one accepts that the electrical power consumption of the installation will increase.

Finally, the condensation pressure and the evaporation pressure indicate the stress exerted by the fluid on the corresponding mechanical parts of the refrigerating circuit. A fluid capable of replacing R-22 in a refrigeration system designed for the latter must not have condensation and evaporation pressures significantly higher than those of R-22.

Apart from exceptions (azeotropes), mixtures of fluids do not boil at a constant temperature for a given pressure, unlike pure bodies. The difference in temperature between the start and the end of boiling, also known as the glide, governs the operation of the exchangers. In the context of substituting R-22, a low glide value close to that of R-407C is desirable.

These new HFC-based products, particularly R-407C, are not, however, compatible with the mineral oils or alkylbenzene oils used in systems operating on R-22 as far as lubricating the mechanical parts is concerned, particularly because of an insufficient return of oil.

They thus require the use of new oils, of the Polyol Ester (POE) or Polyalkylene Glycol (PAG) type.

The replacement of R-22 in the numerous existing heat transfer systems designed to operate on that fluid, by a fluid which has similar thermodynamic performance and an ozone depletion potential of zero therefore entails, apart from replacing the refrigerant, changing the lubricating oil, and possibly even changing certain components of the refrigeration circuit such as the connecting pipework and seals. Such a conversion procedure is practically impossible with certain widespread compression hardware such as the sealed compressor. In any event, it is a lengthy, painstaking and expensive operation especially since in order to eliminate all of the old oil, the system needs to be flushed several times with the new oil.

European Patent application EP 0638623 mentions an almost azeotropic composition consisting of 5 to 20% of R-125, 75 to 90% of R-134a and 1 to 5% of dimethyl ether (hereafter DME). This composition is mentioned as being usable as a substitute for R-502 which is a mixture of 48.8% of R-22 ($CHClF_2$) and 51.2% of R-155 ($CClF_2CF_3$). It is not, however, suitable for substituting for R-22, particularly in air conditioning.

It is an object of the present invention to overcome these various drawbacks.

DETAILED DESCRIPTION OF INVENTION

The subject of the invention is, first and foremost, a composition consisting essentially of 55 to 94% R-125, 2.5 to 35% of R-134a and 3.5 to 25% of DME. A composition consisting essentially of 60 to 85% of R-125, 10 of 32% of R-134a, and 5 to 8% of DME is preferred. The percentages given in this text refer, unless otherwise stipulated, to percentages by weight.

This composition can be substituted for R-22 in its various applications, particularly for air conditioning. In addition it advantageously has thermodynamic performance which allows it to be substituted, without disadvantage, for R-22 in a heat transfer installation designed to run on that fluid, particularly allowing a return of oil far better than that of R-407C when the oil used is precisely a mineral oil or an alkylbenzene oil. It is therefore not necessary, in the procedure of converting existing hardware operating on R-22, to change the oil, unlike the situation which arises when R-22 is replaced by R-407C.

The following specific compositions are particularly advantageous:

R-125: 63.5% R-134a: 31.5% DME: 5%
R-125: 73.5% R-134a: 21% DME: 5.5%
R-125: 82% R-134a: 12% DME: 6%.

The last of these three compositions is even more preferred.

The composition according to the invention can therefore be used as refrigerant in a heat transfer system designed for R-22 and comprising, as lubricant, a mineral oil or an alkylbenzene oil. Another subject of the present invention is this use. A heat transfer system designed for R-22 comprises a refrigerating circuit the mechanical parts of which, particularly the evaporator and the condenser, are compatible with the stresses resulting from the pressure exerted by the R-22 during its refrigerating cycle.

The composition that is the subject of the invention can be prepared by methods well known to those skilled in the art such as by mixing each of its components in the liquid state in the desired proportions.

Another advantage of the composition that is the subject of the invention is its chemical compatibility with the polymers commonly used to make the seals or connecting pipes in refrigerating circuits operating on R-22. These polymers are, for example, EPDM (Ethylene-propylene-diene terpolymer), Hypalon® (chlorosulphonated polyethylene), neoprene® (polychloroprene), Viton® (hexafluoropropylene/vinylidene fluoride copolymer), nylon-6,6 (PA-6,6), polyethylene terephthalate (PET) and polytetrafluoroethylene (PTFE).

A final subject of the present invention is a heat transfer system designed for R-22 and comprising, as refrigerant, the composition as defined above.

The lubricant employed in such a system is advantageously a mineral oil or an alkylbenzene oil.

The heat transfer systems are refrigerating systems, air conditioning systems or heat pumps. Air conditioning systems are more particularly preferred.

The examples which follow are given purely by way of illustration of the present invention and are not to be interpreted as restricting its scope.

EXAMPLES

Examples 1–8

Figure 1:
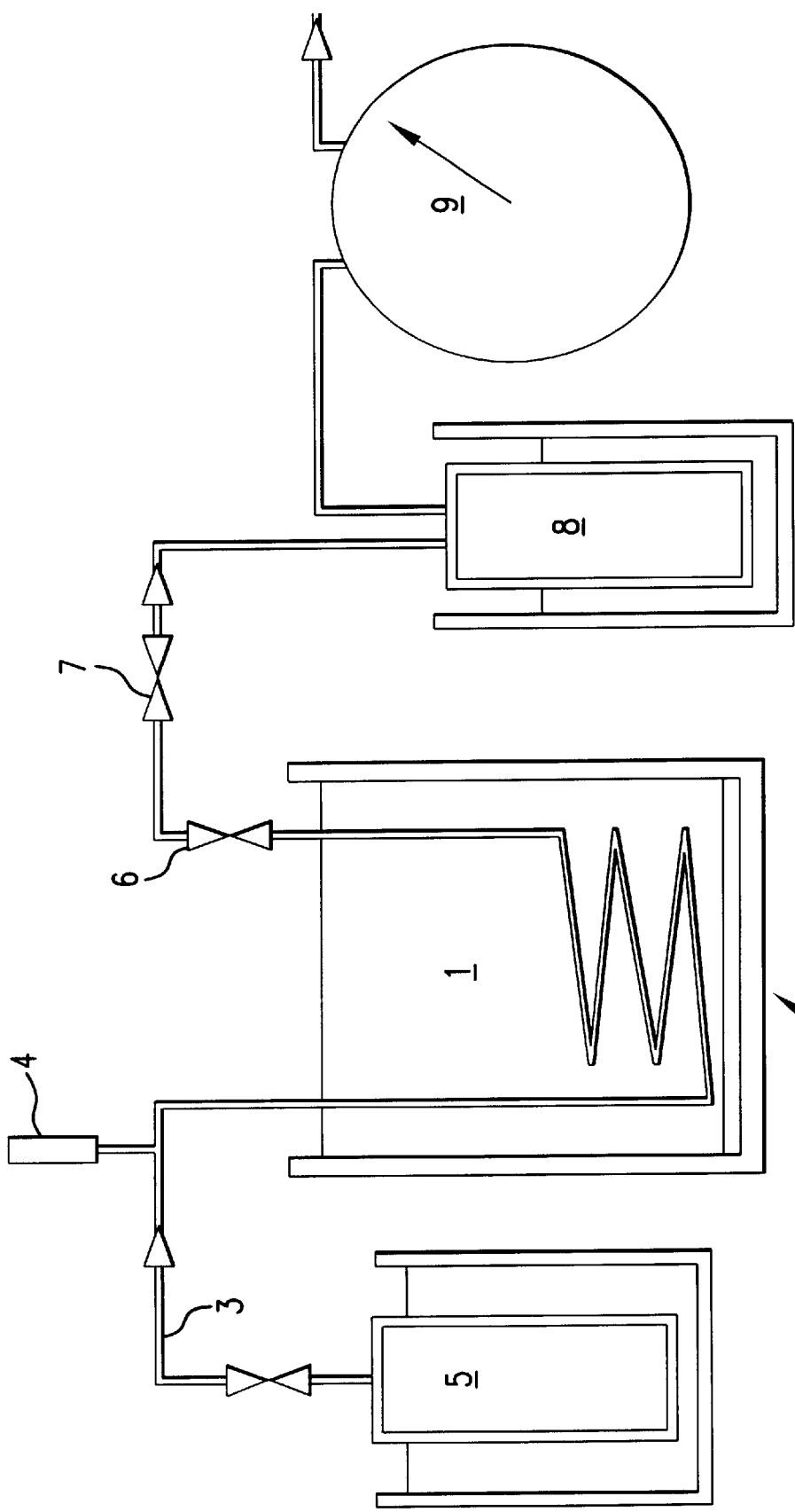
FIG. 1 represents a refrigerating circuit

Various compositions according to the present invention were prepared and subjected to the following tests.

a) Return of Oil

A charge of 5 g of mineral oil was introduced into a refrigerated coil (1) placed in a cryostat (2) at 0° C.

This coil is connected, at the upstream end, via a pipe fitted with a shutoff valve (3) and a pressure sensor (4), to a cylinder (5) containing the composition according to the invention to be tested, equipped with a dip tube and placed in a bath at 30° C.

The coil was continued in the downstream direction by a pipe fitted with a regulating valve (6) and a shutoff valve (7) which arrived at the bottom part of a collection cylinder (8) placed in a heating bath at 60° C. A pipe from the upper part of the collecting cylinder was fitted with a gas meter (9).

The circuit described in FIG. 1 represents a refrigerating circuit near the evaporator, and the return of oil test consisted in measuring the fraction of the charge of oil placed in the coil carried away by the refrigerant.

A stream of the composition according to the invention to be tested, was circulated for 30 minutes, by initially opening the shutoff valve (7) followed by the shutoff valve (3) at a flow rate of about 1 $m^3$/h 0° C. and at 1 atmosphere, through the circuit described above and particularly through the coil containing the charge of oil.

At the end of the test, the amount of oil collected in the cylinder (8) was weighed.

The collection rate or "return of oil" (expressed as a percentage) is equal to the weight of the oil thus collected divided by the weight of the charge of oil placed initially in the coil.

b) Thermodynamic Performance

The performance of the composition according to the invention was evaluated in a refrigerating loop, the operating conditions of which were: an evaporation temperature of 0° C., a compressor intake temperature of 15° C., a condensation temperature of 40° C. and supercooling of the liquid at the outlet of the condenser of 5K.

The R-125, R-134a and DME contents of the prepared compositions, together with the results obtained in these two tests, are collated in Table 1 below. By way of reference, the results for R-22 and R-407C are also shown.

It can be seen that the compositions illustrated have a refrigerating capacity similar to that of R-22 while having a COP that remains at the same order of magnitude as that of R-407C. They are therefore suitable for use as a substitute for R-22, in its air conditioning and refrigerating applications.

In addition, they offer a return of oil and therefore a compatibility that is improved with the mineral oil used for R-22 and have evaporation and condensation pressures below those of R-22, which confirms the possibility of their being used for simplified conversions of installations.

TABLE 1

| Example No. | 1 | 2 | 3 | 4 | 5 | 6 | 7 | 8 | R-22 | R407C |
|---|---|---|---|---|---|---|---|---|---|---|
| DME | 5 | 5.5 | 6 | 12.5 | 25 | 25 | 10 | 3.5 | | |
| R-134A | 31.5 | 21 | 12 | 2.5 | 2.5 | 20 | 35 | 35 | | 52 |
| R-125 | 63.5 | 73.5 | 82 | 85 | 72.5 | 55 | 55 | 61.5 | | 25 |
| R-32 | | | | | | | | | | 23 |
| R-22 | | | | | | | | | 100 | |
| Refrigerating capacity (kJ/m$^3$) | 2840 | 2980 | 3110 | 3000 | 2630 | 2430 | 2610 | 2840 | 3400 | 3330 |
| COP | 5.60 | 5.54 | 5.49 | 5.59 | 5.76 | 5.80 | 5.70 | 5.58 | 5.70 | 5.60 |
| Pcond (bar) | 13.8 | 14.7 | 15.5 | 14.6 | 12.3 | 11.3 | 12.4 | 13.9 | 15.4 | 15.7 |
| Pevap (bar) | 4.1 | 4.4 | 4.7 | 4.4 | 3.6 | 3.3 | 3.6 | 4.1 | 5.0 | 4.7 |
| Glide (K) | 6.8 | 7.2 | 7.2 | 7.2 | 5.9 | 5.1 | 6.4 | 6.5 | 0 | 7.2 |

Example 9

Chemical compatibility with the polymers commonly used with R-22:

The length of test specimens of fixed dimensions made of these polymers and their tensile strength (test specimens of type H2 according to AFNOR (1'Association Francaise de Normalisation) standard NFT 46002) were measured before and after these specimens were left in contact for one week with the composition of example 3 in a stainless steel autoclave cell held at 60° C. This cell was filled with refrigerant to such an extent that the test specimens were entirely immersed in the liquid.

The results are given in Table 2 below.

TABLE 2

| Polymer | Variation in length (in %) | | Variation in tensile strength (in %) | |
|---|---|---|---|---|
| | Example 3 | R-22 | Example 3 | R-22 |
| EPDM | 0 | −0.2 | −4.5 | 0 |
| Hypalon ® | 1.5 | 1.6 | −4.8 | −14.9 |
| Neoprene ® | −0.8 | −1.5 | 7.2 | −11.9 |
| Viton ® | 3 | 2.9 | −16 | −25.9 |
| PA-6,6 | −0.5 | 0.3 | 24.2 | −11.4 |
| PET | −0.1 | −0.5 | −1.2 | −47.5 |
| PTFE | 0.9 | 1.4 | 0.9 | −13.4 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Composition consisting essentially of 55 to 94% of R-125, 2.5 to 35% of R-134a and 3.5 to 25% of DME.

2. Composition according to claim 1, wherein it consists essentially of 60 to 85% of R-125, 10 to 32% of R-134a, and 5 to 8% of DME.

3. Composition according to claim 1, wherein it is selected from one of the compositions from the following list:

R-125: 63.5% R-134a: 31.5% DME: 5%
R-125: 73.5% R-134a: 21% DME: 5.5%
R-125: 82% R-134a: 12% DME: 6%.

4. Composition according to claim 1, wherein it consists of 82% of R-125, 12% of R-134a and 6% of DME.

5. Method for refrigeration in a heat transfer system designed for R-22 comprising conducting heat transfer with a composition according to claim 1.

6. Method according to claim 5, further comprising a lubricant.

7. Method according to claim 6, wherein the lubricant is mineral oil or alkylbenzene oil.

* * * * *